May 13, 1930.  F. W. SHIRRIFF  1,758,089
FOOD PRODUCT AND METHOD OF PREPARING
Filed Oct. 3, 1927
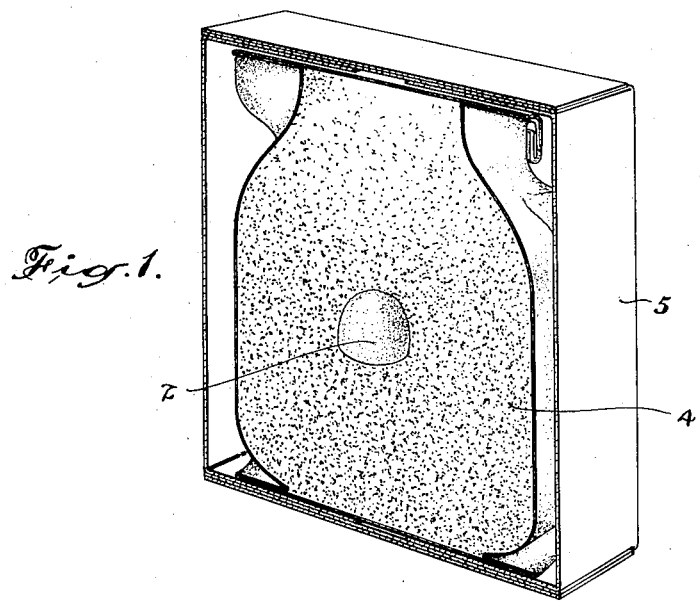
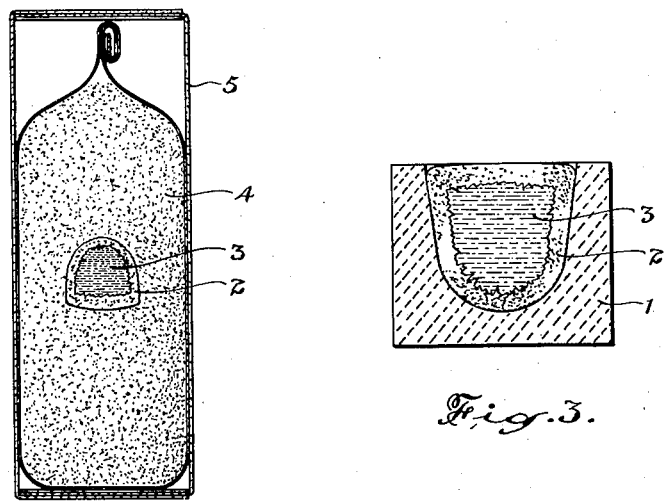
Inventor.
Francis W. Shirriff.

Patented May 13, 1930

1,758,089

UNITED STATES PATENT OFFICE

FRANCIS WALKER SHIRRIFF, OF TORONTO, ONTARIO, CANADA, ASSIGNOR OF ONE-THIRD TO WILLIAM M. SHIRRIFF AND ONE-THIRD TO COLIN H. SHIRRIFF, BOTH OF TORONTO, CANADA

FOOD PRODUCT AND METHOD OF PREPARING

Application filed October 3, 1927. Serial No. 223,697.

The principal objects of the invention are to obviate the deterioration of the volatile flavoring in prepared food products during the period lapsing between their manufacture and use thereby maintaining their standard of quality and avoiding losses through the goods being retained in stock for long periods.

A further and very important object is to incorporate the flavoring into the main body of the product in such a manner that no separate handling of the flavoring by the user will be required and also so that no substance foreign to the materials contained in the product will be required in effectively retaining the flavoring from evaporation.

The principal feature of the invention consists in introducing the flavoring extract into a sugar syrup and effecting the crystallization of an impervious shell about a quantity of the syrup and placing such shell in the food product.

In the accompanying drawings, Figure 1 is a sectional perspective view of a package of a food product prepared according to this invention.

Figure 2 is a cross sectional view through the package and the contained flavoring extract.

Figure 3 is an enlarged sectional view of the flavoring extract unit and the mould for making same.

In the preparation of packaged food products such as jelly powders and the like it is customary to mix with the various ingredients the required quantity of flavoring material but it is found that the highly volatile flavoring rapidly evaporates. Numerous forms of containers for enclosing the flavoring extract separate from the ingredients of the food product have been proposed but these have not proved satisfactory on account of the possibility of breakage and on account of the necessity of handling a separate container.

According to the present invention a sugar syrup is first prepared and the desired flavoring extract is then thoroughly incorporated thereinto and it is then formed into globules of the desired size and so treated as to quickly form a crystalline shell to completely enclose the syrup. This result is effectively accomplished by dropping the syrup into moulds 1 preferably formed of starch or other suitable absorbent material. The rapid absorption of moisture from the surface of the syrup contacting with the mould causes immediate crystallization of the sugar in the syrup and a hard shell 2 of sugar is formed about the syrup globule 3. The sugar shell thus formed is sufficiently hard to allow the handling of the globule and the contained syrup with its constituent is placed in the food product 4 contained in the package 5.

It will be readily understood that as the shell 2 is formed by the surface crystallization of the syrup the contained syrup will not saturate through the shell and the hard crystal shell effectively prevents evaporation of the flavor.

The sugar shell thus formed contains no foreign matter and it will readily melt with the other food product contained in the package when it is being treated in its final preparation for use.

It will be apparent that no handling of the flavoring container by the user is necessary, the contents of the package is emptied into a receptacle and the whole contents are treated together.

What I claim as my invention is:

1. The combination with a soluble food product, of a globule of flavoring material confined to retain its volatile matter within a soluble crystallized shell and incorporated in said soluble food product.

2. The combination with a mass of soluble non-flavored food product, of a globule of sugar syrup containing a quantity of flavoring extract sealed to retain its flavor having a soluble sugar shell crystallized therearound, and incorporated in the soluble mass.

3. The combination with a soluble food product, of a quantity of sugar syrup containing a flavoring extract formed into a globule with its external surface crystallized and forming a hard soluble shell container, the latter being incorporated in said soluble food product.

4. A food product, comprising a mixture of non-flavored edible ingredients in soluble powder form, and a globule of syrup containing a flavoring extract having its surface crystallized to form a hard soluble shell, said soluble shell being incorporated in the soluble powder and forming therewith a soluble flavored compound.

FRANCIS WALKER SHIRRIFF.